United States Patent [19]

Taylor

[11] 3,856,398
[45] Dec. 24, 1974

[54] APPARATUS AND METHOD FOR WIDE AREA, DARK FIELD, HIGH RESOLUTION AUTORADIOGRAPHY

[76] Inventor: Dermot B. Taylor, 3914 Sierks Way, Malibu, Calif. 90265

[22] Filed: Nov. 13, 1972

[21] Appl. No.: 305,993

[52] U.S. Cl.......................... 355/63, 355/52, 355/71
[51] Int. Cl. ........................................... G03b 27/68
[58] Field of Search ............ 355/52, 67, 71, 55, 61, 355/62, 63; 350/96 R

[56] References Cited
UNITED STATES PATENTS

| | | | |
|---|---|---|---|
| 697,738 | 4/1902 | Miller | 355/52 X |
| 1,351,618 | 8/1920 | Byron | 355/52 |
| 1,365,688 | 1/1921 | Hastings | 355/52 |
| 3,492,070 | 1/1970 | Zahn | 350/96 R |
| 3,516,724 | 6/1970 | Ashton et al. | 350/96 R |
| 3,561,867 | 2/1971 | Simmon | 355/67 |
| 3,716,298 | 2/1973 | Reardon | 355/71 |

FOREIGN PATENTS OR APPLICATIONS

| | | | |
|---|---|---|---|
| 196,641 | 3/1958 | Austria | 355/52 |
| 450,829 | 8/1949 | Italy | 355/52 |

*Primary Examiner*—Samuel S. Matthews
*Assistant Examiner*—E. M. Bero
*Attorney, Agent, or Firm*—Miketta, Glenny, Poms & Smith

[57] ABSTRACT

A camera comprising an image stage and an object stage each mounted to opposite ends of a camera frame and adjustable relative thereto by means of a set of three spaced apart image stage micrometer means and a set of three spaced apart object stage micrometer means. The image stage and object stage micrometers are located at the vertices of imaginary equilateral triangles, with the defined image stage triangle rotated 60° relative to the defined object stage triangle whereby certain of the image stage and object stage micrometers may be cooperatively adjusted to facilitate focusing of the image. There is also provided a fiber-optic light guiding means having flattened and flared ends for directing light into the side edges of the slide; a light source comprising parabolic and spherical reflectors for developing a high intensity-low heat light source for the fiber-optic means; and polarizing filter means mounted between the fiber-optic light source and the edges of the autoradiographical slide and in the optical path between the slide and the lens system to provide means for maximizing the resolution of light reflected from the slide specimen.

7 Claims, 7 Drawing Figures

APPARATUS AND METHOD FOR WIDE AREA, DARK FIELD, HIGH RESOLUTION AUTORADIOGRAPHY

BACKGROUND OF THE INVENTION

In general the present invention relates to microscopic photography and in particular to a method and apparatus of wide field high resolution microscopic photography. The method and apparatus in accordance with the present invention is especially adapted for producing enlarged photographical recordations of autoradiographical slides to facilitate automatic counting of the grain information carried by each such slide.

In autoradiography, a thin slice of biological tissue or organ containing a radioactive drug or chemical is placed in contact with a photographic emulsion deposited as a film on an upper surface of a microscope slide. After suitable exposure and development, the radioactivity in the tissue is quantitatively represented in the photographic emulsion as minute silver grains having a density of approximately thousands to millions per square millimeter of tissue with the number varying in accordance with the intensity of tissue radioactivity. The intensity of radioactivity within localized areas of the tissue is indicative of the functioning of biological mechanisms by which a radioactive chemical or drug is distributed throughout an organism. Such information is useful to doctors and scientists in assessing the biological or pathological mechanism under study. In the past, it has been typical to collect data on the radioactivity of an autoradiographical slide by counting the photographic grains within a unit area as viewed under a microscope. However, the observed silver grains are approximately 0.2 microns in diameter and even when magnified under a high quality microscope, they are difficult to resolve and tedious to count. This limitation in the observer's capacity to count grains, is a shortcoming in conventional autoradiography.

It has heretofore been proposed to automatically count these grains by producing an enlarged photograph of the autoradiographical slide and process such photographs in known electro-optical scanning systems, sometimes referred to as microdensitometers. Given a suitable photograph of the grain intensity, such microdensitometers are capable of automatically developing numerical counts of density relative to an X-Y plot correlated to localized positions on the processed photographs. The numerical density information can thereafter be processed in a digital computer with an output having a format meaningful to the researcher. However, photographic recordations of the autoradiographical grain intensity have heretofore not provided the necessary amplification and resolution necessary to take advantage of the automatic grain counting equipment, such as the microdensitometer. High resolution in the photograph is an absolutely essential requirement in that the grain count for a millimeter square may be thousands to millions. Furthermore, adequately high resolution of the dense grain count is desirable in order to achieve one of the purposes of autoradiography, namely to determine the anatomical location of the radioactivity as precisely as possible. Localizing the radioactive drug within the tissue carred by the autoradiographical slide may typically require identification of an organ, at the cellular or sub-cellular level. Also it is desirable to derive as much information as possible concerning the concentration of the radioactive agent in each of the localized areas where it is found. Such information again requires a high resolution of the grain intensity. Other cases require knowledge of intensity in order to determine the extent to which a radioactive substance is broken-down or metabolized, or to determine the characteristics of the metabolic products.

While it has been found possible in some cases to develop sufficiently high resolution and enlarged photographs of very small areas of an autoradiographical slide, suitable for processing by a microdensitometer, such photographic recordations have not provided a sufficiently wide field of information to enable the researcher to relate the photographed area to surrounding areas. For example, if a thin slide of an organ under study is developed on an autoradiographical slide, such prior photographic techniques have not permitted an enlarged high resolution recordation of the entire organ slice, but only of a very small portion thereof.

SUMMARY OF THE INVENTION AND ITS OBJECTIVES

Accordingly, it is an object of the present invention to provide an apparatus and method of high resolution wide field microscopic photography.

It is another object of the present invention to provide such an apparatus and method of high resolution wide field photography especially for producing enlarged photographs of autoradiographical slide information to permit processing of the photographic recordation by an automatically scanning microdensitometer.

These and other objects are achieved in accordance with the present invention by an apparatus and method for photographing grain information carried by an autoradiographical slide disposed at an object stage of a camera in which the image to be recorded on a photographic emulsion is produced at an image stage and wherein the object and image stages are movably mounted relative to a camera frame and lens system by a set of three object stage micrometer means and a set of three image stage micrometer means. The object stage micrometers are disposed at the vertices of an equilateral triangle, each being adjustable to move the object stage to and from the camera frame. Similarly, the image stage micrometers are individually located at the vertices of another equilateral triangle, but with the image stage triangle rotated 60° relative to the triangular pattern of the object stage micrometers. This arrangement affords a particularly advantageous method of focusing the image at the image stage.

Further in accordance with the present invention, dark field intensification at the object stage is provided by a light source including fiber-optic guides having flattened and flared ends disposed to direct light directly into opposing side edges of the transparent autoradiographical or microscope slide. The light for application to the fiber-optic light guides is developed by a high intensity low-heat light source consisting of a novel arrangement of parabolic and spherical reflecting mirrors designed to collect all of the light emitted by an arc lamp.

A further feature of the present invention provides for selectively polarizing the light incident on the edge of the autoradiographical slide via the optical light guides and similarly selectively polarizing the reflected light from the grain information carried by such slide as it is passed into the camera lens system. By this polarization, it has been found possible to optimize the desired reflected information from the autoradiographical grains and to attenuate stray light reflected from other sources, thus increasing the resolution of the ultimate photographic recordation.

Another feature of the present invention provides indexing means located on the lower surface of the object stage opposite the camera frame for precisely positioning the upper planar surface of the autoradiographical slide. By this arrangement, different specimen slides may be disposed for photographing without disturbing the positional relationship, namely distance, of the specimen located on the upper surface of the slide relative to the camera lens and image stage, notwithstanding variations in the thickness of the various glass slides employed.

These and further objects and various advantages of the method and apparatus in accordance with the present invention will become apparent to those skilled in the art from a consideration of the following detailed description of an exemplary embodiment thereof. Reference will be made to the appended sheets of drawings in which:

DESCRIPTION OF THE PREFERRED EMBODIMENT

Figure 1:
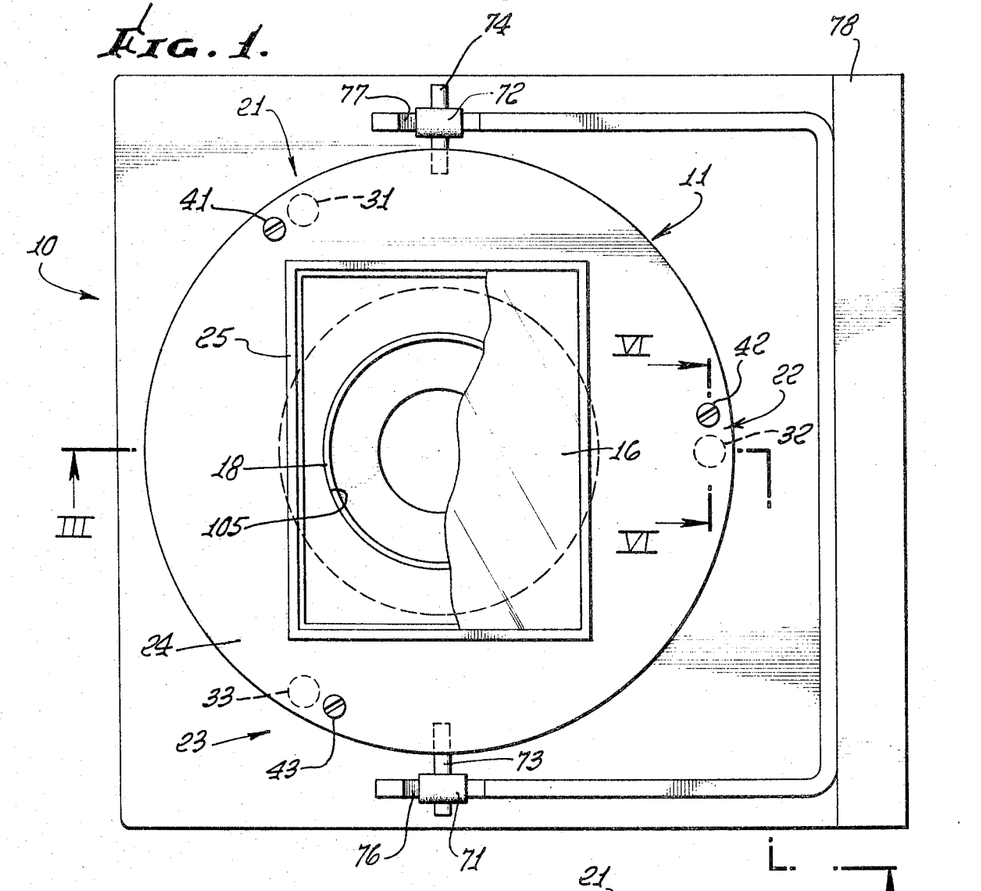
FIG. 1 is a top plan view of the camera apparatus in accordance with the present invention, partially cutaway for clarity.
Figure 3:
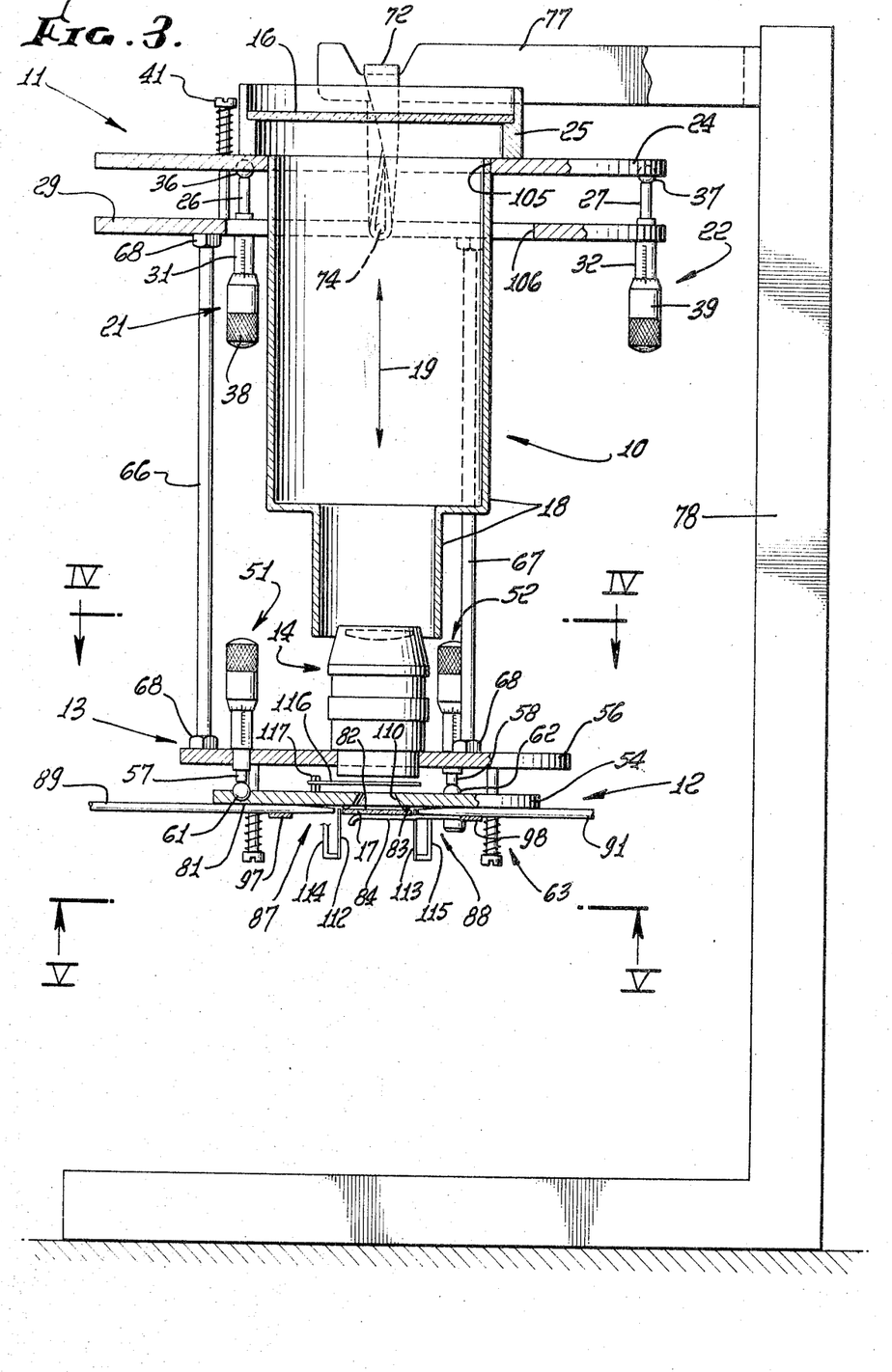
FIG. 3 is a sectional view taken along the plane III—III of the camera apparatus of FIG. 1.

With reference to FIGS. 1 and 3, the apparatus of the present invention generally comprises a camera 10 arranged to effect enlarged photographic recordations at an image stage 11 of relatively small objects, particularly autoradiographical specimens carried by a microscope slide, positioned at an object stage 12. A camera frame 13 carries a special lens system 14 as shown arranged to display wide field enlarged, and in this instance inverted, images at plate 16 of the specimen object located on the upper surface of a transparent glass slide 17. Slide 17 is provided by a standard microscope specimen slide. A cylindrical light shield or shroud 18 depends downwardly from the image stage 11 and is arranged coaxially with the optical light path 19 so as to shield against stray light otherwise entering the system between lens 14 and plate 16.

In focusing the enlarged image on plate 16, it is necessary to precisely position the image plane, in this instance defined by the lower surface of plate 16, and the object plane, here defined by the upper surface of glass slide 17, at precise distances relative to lens system 14 and simultaneously establish parallelism between the object and image planes. In accordance with the present invention, image stage 11 and object stage 12 are both mounted to camera frame 13 by two separate sets of three micrometer means each, one set for the object stage and one set for the image stage.

Thus, for image stage 11, a set of three precision micrometers 21, 22 and 23 are individually disposed at the vertices of an imaginary equilateral triangle having a plane parallel to the image stage plane defined by plate 16. Here, an apertured circular plate 24 provides a support for image stage plate 16, and each of the micrometer means are disposed to provide adjustable movements of their respective spindles, such as spindles 26 and 27 of micrometers 21 and 22 for positioning plate 24 and thus the image plate. In particular, plate 24 is continuously urged by spring means toward an image end of camera frame 13 provided by an image end plate 29. The barrels 31, 32 and 33 of the respective micrometers are fixedly mounted to plate 29 such that the micrometer spindles are adjustable relative to the barrels and the image end of camera 13 along lines parallel to optical axis 19, each such line extending through the vertices of the imaginary equilateral triangle mentioned above. For example, as shown for micrometers 21 and 22, spindles 26 and 27 are disposed for adjustable displacement as described in which the free axial ends thereof abut individual indexing means here in the form of raised semi-spherical abutments provided by ballbearings imbedded within plate 24. In this manner, the set of three image stage micrometers provides for complete angular and distance control of the image plane carried by plate 24 relative to camera frame 13. Individual adjustment of the micrometers is provided by rotating their thimbles, such as thimbles 38 and 39 of micrometers 21 and 22, while observing the scale markings provided on the respective thimbles and barrels.

Figures 4, 5, 6, 7:
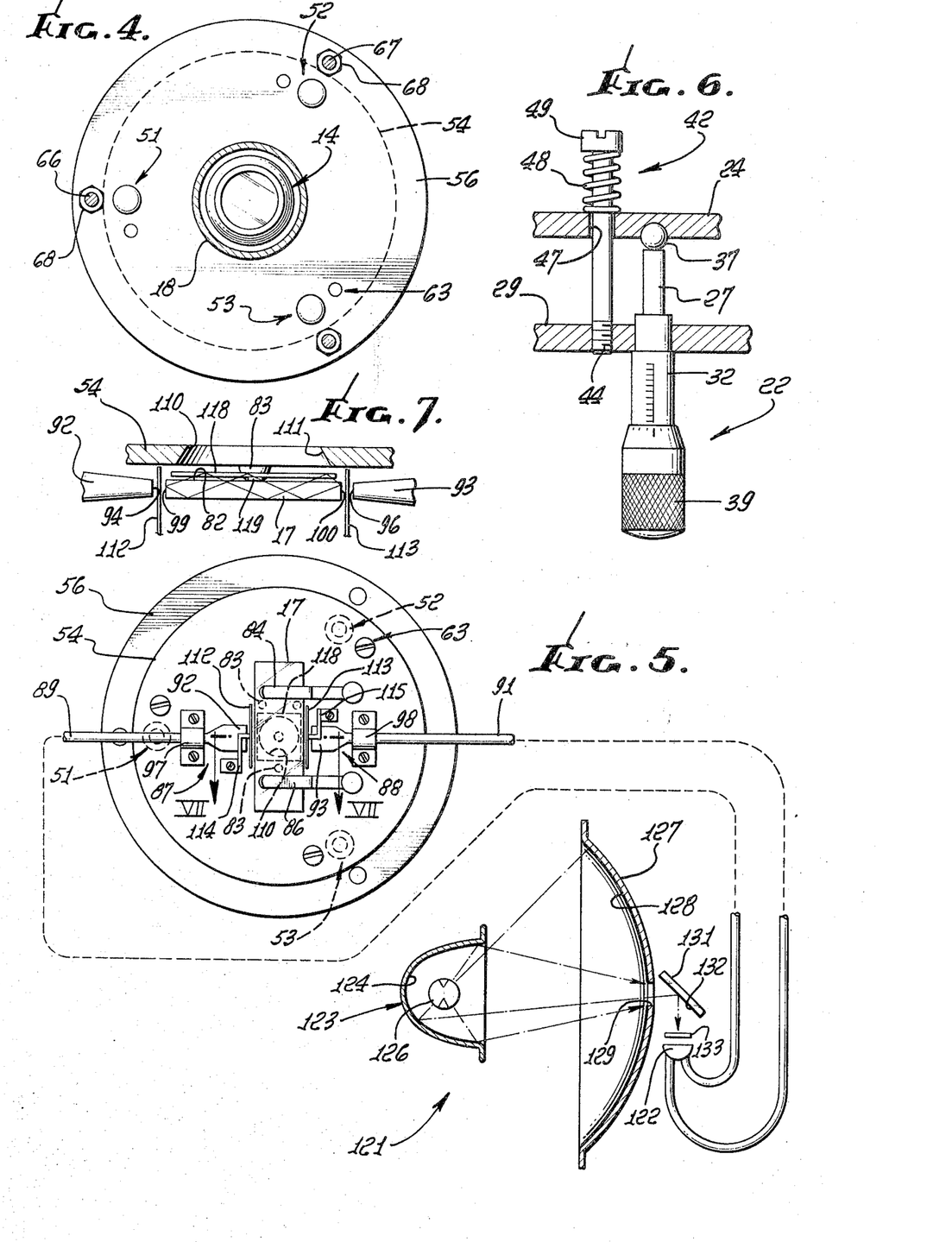
FIG. 4 is a sectional view taken along plane IV—IV of FIG. 3.
FIG. 5 is a bottom plan view of the camera apparatus of FIG. 3 as seen from V—V and diagrammatically illustrates a light source in accordance with the invention for connection to the fiber-optic light guides carried by the object stage of the camera apparatus.
FIG. 6 is an enlarged fragmentary view, partially in section as taken generally along the plane VI—VI of FIG. 1, illustrating one of the micrometer adjustment means carried at the image stage.
FIG. 7 is an enlarged fragmentary sectional view taken generally along the plane indicated by VII—VII of FIG. 5.

To guide image stage plate and for urging it toward camera frame 13, a set of three elongate alignment pins or bolts 41, 42 and 43 are provided each having a threaded end secured to plate 29 as shown by threaded end 44 of bolt 42 in FIG. 6 with the smooth shank portion of each bolt extending upwardly from plate 29 normal thereto and passing through guide holes such as hole 47 of FIG. 6, formed in image stage plate 24 in registration with each of the alignment bolts. Each bolt provides a support for a elongate coil spring, such as spring 48 in FIG. 6, which springs are disposed in compression between an upper surface of plate 24 and the lower shoulder of each of the bolt heads, such as head 49 of bolt 42, again as shown in FIG. 6. By this arrangement, bolts 41, 42 and 43 and the cooperating spring members provide for continuously urging image stage plate 24 with indexing abutments, such as abutments 36 and 37, against the three axial ends of the micrometer spindles. Guide holes, such as hole 47 in end plate 24 are loosely fitting around the shanks of each of bolts 41, 42 and 43 to allow for correcting the planar orientation of the image stage by means of the micrometer adjustments.

Figure 2:
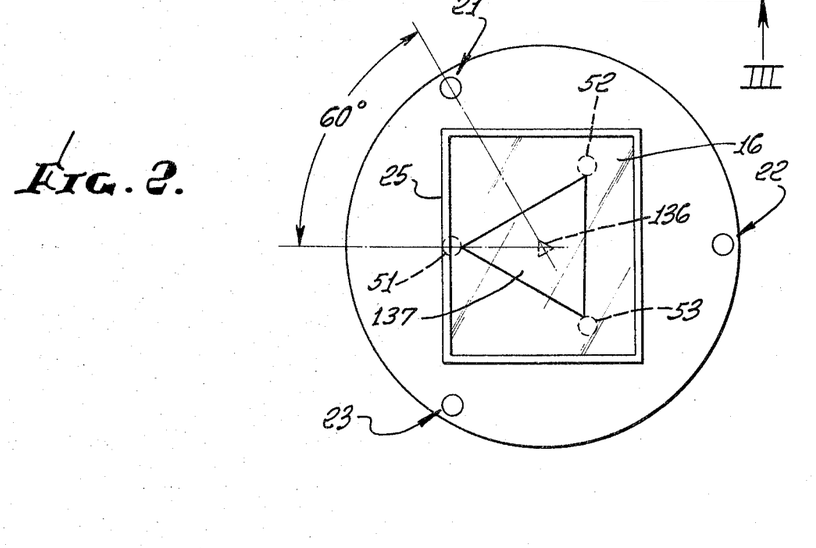
FIG. 2 is a fragmentary view of the top of the camera apparatus as shown in FIG. 1, on a reduced scale, diagrammatically illustrating the method by which the camera assembly is focused.

In a similar manner, the object stage 12 of the camera apparatus is provided with a set of three micrometers 51, 52 and 53, arranged at the vertices of an imaginary equilateral triangle similarly to micrometers 21, 22 and 23, except the object stage equilateral triangle is rotated or displaced 60° relative to the imaginary triangle defining the placement of the image stage micrometers. Thus as illustrated in FIG. 2, object stage micrometers 51, 52 and 53 are symmetrically alternated with image stage micrometers 21, 22 and 23. The mounting of an object stage circular plate 54 relative to an object end plate 56 of camera frame 13 corresponds to the mounting of image stage plate 24 relative to plate 29.

By virtue of this arrangement, each object stage micrometer may be adjusted cooperatively with a diametrically opposed image stage micrometer to adjustably pivot, respectively, the object stage plane, defined by plate 54 and the upper surface of slide 17, and the image stage plane, defined by plate 24 and glass plate 16, about parallel and spaced apart axes to facilitate focusing of the assembly. This operating characteristic is illustrated in FIG. 2 in which for example, object stage micrometer 51 may be cooperatively adjusted with the diametrically opposed image stage micrometer 22 such that the object stage plane is pivoted about an axis passing through the other pair of object stage micrometers 51 and 53 while the image stage plane is simultaneously pivoted about an axis passing through the other pair of image stage micrometers 21 and 23, such pivotal axes being parallel and spaced apart. The significance of this arrangement and operation will become more apparent from the description herein concerning the method by which the camera is focused. For the present however, it will be observed that the image is inverted relative to the object by reason of the particular lens system employed, such that portions of the object closest to one of the object stage micrometers correspond to portions of the image closest to the image stage micrometer diametrically opposed from such object stage micrometer. This affords two modes of control for focusing the same image area without significantly disturbing the parallelism of the object and image planes.

Object stage 12 thus provides for mounting micrometers 51, 52 and 53 with the barrels thereof fixedly attached to plate 56 of camera frame 13 such that the micrometer's spindles, such as spindles 57 and 58, provide adjustable displacement along lines parallel to optical axis 19 and each extending through the vertices of the image stage micrometers. The free ends of such spindles, such as spindles 57 and 58, engage the index means provided on plate 54 by raised semi-spherical abutments in registration with the respective spindles. Such abutments are shown for example at abutments 61 and 62 formed in the manner described for abutments 36 and 37 for the image stage plate 24. Three spaced apart alignment bolt and spring guide assemblies, such as assembly 63 shown in FIG. 3, are provided for guiding object stage plate 54 and continuously urging it toward the object end plate 56 of camera frame 13 in the same manner as alignment bolts 41, 42 and 43 including their associated springs guide and urge image stage plate 24 toward plate 29. Thus the threaded ends of each of the bolts provided as shown by assembly 63 are in this instance secured to plate 56.

Plate 56 also carries lens system 14 as best shown in FIG. 3. Plates 29 and 56 are rigidly fixed in substantially parallel and spaced apart planes by means of three parallel spaced apart tie rods, of which rods 66 and 67 are illustrated in FIG. 3, each having its opposed ends threadedly secured to the respective plates 29 and 56 and there locked in place by suitable means such as nuts 68.

In use, camera 10 is adapted to be suspended from a vibration-free mount, here in the form of rubber bands 71 and 72 supporting the assembly by pins 73 and 74 outwardly extending from camera frame plate 29 and by bracket arms 76 and 77 carried by base 78. Pins 73 and 74 may also directly rest on arms 76 and 77 to support the camera when not in use.

Preferably object stage micrometers 51, 52 and 53 are selected to provide a finer adjustable movement than image stage micrometers 21, 22 and 23 due to the greater effect that movement of the object stage has on the resulting photographic image. Thus, object stage micrometers 51, 52 and 53 are provided by special class of micrometers referred to as differential screw translators which achieve controllable movements 120th of the displacement achievable by conventional photographic plate micrometers such as employed here for the image stage.

In order to provide the wide field high resolution characteristics of the present camera system, a special computer corrected lens system 14 is employed. This lens provides for magnification of an object 8 millimeters in diameter 10 times at a minimum resolution of 1,000 line pairs per millimeter at the displayed image. To achieve this high resolution, the lens system is a diffraction limited lens which means, except for diffraction produced by the unavoidable edges of the lenses, it has no significant aberrations either spherical or chromatic. This precision is achieved by correcting the lens for only one frequency of light, in this instance the correction is for the mercury $g$ line (435.8 nanometers) such that the lens operates most efficiently only at this single wavelength. As will be described more fully herein this single frequency light source is obtained by an appropriately filtered light emission from a mercury arc lamp. Furthermore, optimum resolution is obtained only for a magnification of 10. It will be appreciated that all of the care and precision employed in constructing lens system 14 will be to no avail unless the object and image stages provided by plates 24 and 54 of the camera apparatus shown in FIG. 3 are perfectly aligned and set at the proper distances relative to the lens system. Accordingly, one of the features of the camera system including its micrometer adjustment means as described above is to provide the necessary precision for focusing this nearly perfect lens system to take advantage of its resolution capability.

With reference to FIGS. 3, 5 and 7, glass slide 17 is mounted at the object stage 12 adjacent a surface 81 of object plate 54 opposite from camera frame 13 and with an upper surface 82 of the glass or microscope slide 17 precisely indexed against a set of three spaced apart small rounded studs 83. In this manner, the upper surface 82 of the glass slide which carries the object to be photographed is precisely positioned by studs 83 which form indexing means defining the position of the upper surface of any glass slide disposed at the object stage. Thus, slide 17 may be replaced with other slides and in each case the object carried by the upper surface of the various slides will be disposed at the same distance relative to the camera apparatus notwithstanding variations in the thicknesses of the different slides. Thus a number of different slides may be photographed in sequence without disturbing the camera focus by reason of slide thickness variations. A pair of leaf spring holders 84 and 86 serve to continuously urge the upper surface 82 of glass slide 17 against studs 83 and springs 84 and 86 are rotatable away from the slide for removal thereof and placement of another microscope slide.

In use of the camera apparatus in accordance with the present invention to photograph autoradiographical slides, it is necessary to provide a high intensity wide area dark field condenser or illuminator specially designed to light up large areas of the photographic grains present on the slide. At the same time stray and unwanted light from other sources should be attenuated or otherwise prevented from entering the optical system of the camera. A particularly advantageous dark field illumination means is provided by the present invention for object stage 12 in the form of a pair of fiberoptic light guides 87 and 88, best shown in FIG. 5 for directing light directly into the edges of glass slide 17 for illuminating the entire slide and the specimen carried thereby. In particular, each of guides 87 and 88 is formed of a light conduit portion 89 and 91, the ends of which are flattened and flared as shown by ends 92 and 93 to define in each case a generally elongate light emitting face, such as face 94 for end 92 and face 96 for end 93 as shown in FIG. 7. The flattened and flared ends 92 and 93 are in each case oriented and fixed by clamp means 97 and 98 to dispose elongate faces 94 and 96 in close confronting registration with side edges 99 and 100 of slide 17 with light exiting from faces 94 and 96 passing directly into the glass body defined by slide 17 as best shown in FIG. 7. Although only one of guides 87 and 88 may be employed depending upon the application, it has been found that the additional illumination provided by using both of the guides directed into opposite side edges of slide 17 is necessary to obtain the desired resolution in the photographic recordation of the autoradiographical image.

To minimize the amount of stray light entering the optical system, aperture 110 in object plate 54 is provided with a beveled edge 111 downwardly and outwardly sloping as shown in FIGS. 3 and 7.

Between lens system 14 and the image stage, shroud 18 shields the system from stray light. Here shroud 18 is carried at an upper end by image stage plate 24 circumferentially joined thereto at central opening 105 in plate 24 and depending downwardly therefrom coaxially through a larger clearance opening 106 formed in end plate 29 of the camera frame 13.

Further in accordance with the present invention, it has been found possible by the placement of adjustable polarizing filters between the fiber-optic light sources and the edges of slide 17 and between aperture 110 of the object plate and lens system 14, that an improved overall resolution can be obtained in the photographed image. In particular, rotatable polarizing filters 112 and 113 are mounted with supporting brackets 114 and 115 as shown in FIG. 3, to provide for adjustably polarizing light exiting from fiber-optic faces 94 and 96 prior to entry of such light into slide 17 at side edges 99 and 100 as best shown in FIG. 7. In this instance filters 112 and 113 are rotatable in a plane perpendicular to the drawing as shown in FIG. 7. An additional polarizing filter 116 is disposed between aperture 110 of object stage plate 54 and lens system 14. Filter 116 is here rotatably mounted about a bracket 117 fixedly carried by plate 54 as shown in FIG. 3. Light from fiber-optic guides 87 and 88 enters the side edges of glass slide 17 and is substantially internally reflected within the body of slide 17 and within the cover glass 118 and the autoradiographical preparation including the specimen shown at 119. Thus light is trapped between the outer glass surfaces of slide 17 and glass cover 118 and can only escape through the edges 99 and 100 opposite from the side of entry. The light guiding characteristics of fiber-optic guides 87 and 88 provide that the light enters the edges of slide 17 at less than the angle of acceptance to insure trapping of the light within the slide and consequent illumination of the object or in this instance of the developed grains resulting from exposure of the autoradiographical emulsion.

In addition to the illumination of the preparation, the repeated reflection of light trapped within slide 17 and cover glass 18 causes a certain amount of polarization of such reflected light. Advantage is taken of this characteristic polarization to improve the resolution of the camera system by the use of the rotatable polarizing light filters 112, 113 and 116 mounted as described above. By rotating these various filters polarization of the light entering slide 17 can be controlled by rotating filters 112 and 113. The light reflected from the photographic emulsion grains of the autoradiographical preparation can thus be selectively emphasized relative to stray and other unwanted light by adjusting polarizing filter 116 to pass only the desired light reflected from these grains. In sum, by appropriate adjustment of these various polarizing filters, the resolution of the grain image on plate 16 of the camera apparatus can be optimized. In addition, in certain cases the polarizing filters contribute to the study of the material or specimen carried by the microscope slide, which itself may polarize the reflected light.

A high intensity source of light must be provided for fiber-optic light guides 87 and 88 to obtain adequate illumination for the autoradiographical slide specimen. The light intensity must be substantial for a number of reasons including the fact that the silver grains of the prepared autoradiographical slide do not reflect much light. Their size, on the order of 0.2 microns in diameter or less, is so small that the magnitude of the reflected light is minimal. Furthermore, the lens system 14 as described above operates with a monochromatic source of light, that is light of a single wavelength, and because of the various filters used to obtain this single wavelength light only a small fraction of the light generated is useable. The photographic plates provided at the image stage for recording the magnified autoradiographical slide image are of a high resolution fine grain variety and such plates have a characteristically slow response thus requiring a greater amount of light to activate. These and other reasons create a problem in obtaining sufficient illuminating light for impinging on glass slide 17.

While various high intensity light sources do exist which are at least adequate for the purpose, the present invention provides an improved light source for the present application, wherein this light source 121 is shown in FIG. 5 directing high intensity monochromatic light into a light receiving coupling 122 for fiber-optic conduits 89 and 91. Source 121 is provided by a parabolic reflector 123 having a light reflective heat transmissive surface 124 formed on the interior concave portion of the parabolic structure. An arc lamp 126 is mounted at the focal point of parabolic reflector 123 and in this instance is provided by a high pressure, short arc, mercury lamp having ancillary equipment (not shown) to strike and maintain the arc. Confronting the parabolic light reflecting surface 124 is a spherical reflector 127 disposed coaxially with reflector 123 and with the center of curvature of a light reflective heat transmissive surface 128 centered at the arc of lamp 126 as shown. By this arrangement, all of the light otherwise escaping the reflective and focusing action of parabolic reflector 123 is reflected back by spherical reflector 127 to the source of light, namely lamp 126 as shown. Light reflecting off of the surface 124 of reflector 123 is concentrated at an aperture 129 formed at the center of curvature in spherical reflector 127. This concentrated source of light is passed through aperture 129 and reflected by a planar reflector 131 disposed at 45° relative to the axis of parabolic and spherical reflectors 123 and 127. Planar reflector 131 is like reflectors 123 and 127 provided with a light reflective and heat transmissive surface 132 so as to permit along with surfaces 124 and 128 dissipation of thermal-energy generated by lamp 126 while at the same time collecting all of the useable light produced. The cooled source of light reflected from surface 132 of reflector 131 is passed through a monochromatic filter 133 for obtaining the above-mentioned mercury g line at approximately 436 nano-meters and from there communicated into coupling 122 serving as a light receiving end of the fiber-optic light guides 87 and 88. Preferably source 121 is cooled by conventional ventilating means (not shown) rather than by a motor driven fan so as to avoid transmitting motor vibrations to the camera assembly via fiber-optic conduits 89 and 91. If source 121 is cooled by a motorized fan, the motor should be provided with a vibration free mounting.

In using the camera apparatus of the present invention, an autoradiographical slide is prepared in the following manner. A cellular structure to be studied is cut into thin slices (on the order of a few microns or less) and one of such slices is placed in contact with a photographic emulsion or film desposited on a microscope slide. After suitable exposure and the development of the latent image, the photographic emulsion contains large numbers of small silver grains located opposite to those parts of the biological specimen containing radioactivity. Moreover, under optimal circumstances the number of developed grains per unit area will be a measure of the radioactivity in the corresponding parts of the tissue specimen. With reference to FIG. 7, such a slide has been prepared with the biological specimen and photographic emulsion being sandwiched between an upper surface 82 of the slide and a lower surface of cover glass 118 where this preparation is shown at 119.

With the autoradiographical slide prepared, the camera now must be focused to prepare for photographing the developed specimen image. For this purpose, and with reference to FIG. 2, the present invention provides a method for focusing the camera apparatus illustrated in FIGS. 1 through 5 wherein the first step of this method is to mount an equilateral triangular test object, shown as object 136 in FIG. 2 on the upper surface of a microscope slide disposed in the proper place at object stage 12. Preferably, this triangular test object consists of an equilateral triangular object of approximately 7.5 millimeters on a side and where the dimensions of each side have been measured to an accuracy of approximately plus or minus 0.02 percent. The test triangle is mounted in a liquid gate or emulsion in the same way that the photographic emulsion grains of an autoradiographical slide are prepared.

Importantly, triangular test object 136 is oriented with its center positioned at substantially equal distances from each of the object stage micrometers and with the sides of the test object adjacent the object stage micrometers and parallel to the sides of the imaginary equilateral triangle defined by the image stage micrometers. The image displayed at plate 16 of image stage 11 is inverted relative to the object by virtue of the characteristics of lens system 14 and as such, triangular test object 136 appears as triangular image 137 in FIG. 2. As image 137 is inverted relative to object 136, the sides of image 137 are parallel to the sides of the imaginary equilateral triangle defined by object stage micrometers 51, 52 and 53. Also each of the sides of triangular image 137 appear adjacent the respective image stage micrometers 21, 22 and 23 so that the triangular test object 136 bears the same relationship to the image stage micrometers 21, 22 and 23 as the triangular image 137 bears to the object stage micrometers 51, 52 and 53. It will thus be observed, that adjustment of one of the image stage micrometers, such as micrometer 21 causes the adjacent side of triangular image 137 to be brought into focus while adjustment of the diametrically opposite object stage micrometer, micrometer 53 in this instance, causes the same focusing effect. This is because the side of the triangular test object proximate to object stage micrometer 53 corresponds to the side of triangular image 137 proximate to image stage micrometer 21 in view of the optical inversion. These various micrometer adjustments, and in particular the cooperation between diametrically opposed image and object micrometers and the triangular test object, afford a method of precisely focusing information carried by the upper surface of a microscope slide on the image stage plate 16.

Initially, a ground glass plate is provided for plate 16 at the image stage to visually display an image of the test object. A rectangular plate holder 25 carried by image stage plate 24 serves to position glass plate 16 as shown in FIG. 3. The object stage micrometers 51, 52 and 53 are each adjusted by a predetermined amount to dispose object stage plate 54 and thus the test object carried by the slide at a given optimum distance from lens assembly 14. This optimum distance is determined by the characteristics of the lens system employed. Next the image stage micrometers 21, 22 and 23 are adjusted to obtain a focused image of the triangular test object with an approximate magnification of 10. The ground glass plate is then replaced by clear glass plate and a small 30 power microscope (not shown) is used to inspect an image formed on a surface of the glass plate so as to permit a critical focus and to enable the placement of measuring means, such as calipers, at the ends of the triangular image. By so measuring the image, it is possible to determine the magnification. As mentioned previously, optimum resolution for this lens system is provided when the magnification is exactly 10. Now with an approximate magnification of 10 and by the use of the small 30 power microscope, the image stage and object stage micrometers may be adjusted in pairs so as to obtain a sharp focus and at the same time the desired magnification of 10 to 1. When the center point of each side of the image triangle 137 is critically focused and the length of each side of the triangular image exhibits a 10 to 1 ratio relative to the corresponding and previously measured size of the test object triangle, then the apparatus is properly focused. When so focused, the object and image planes will be in precise parellelism and at right angles relative to optical axis 19. Without this precision in the optical orientation of the image and object planes, a condition known as "keystoning" will result. Small amounts of "keystoning" are hard to detect and although the lens may appear in focus, it will not deliver its optimum resolution.

A high resolution photographic plate may now be disposed in the position of plate 16 and with an autoradiographical slide in place and the light source 121 may be energized to develop a photographic recordation of the autoradiographical image. This photograph may in turn be processed by equipment mentioned above, such as high speed rotary microdensitometer and the numerical output therefrom analyzed by specially programmed computers. If a rotary microdensitometer is employed then the exposed image must be transferred to a flexible film for mounting on a rotating drum. In the alternative a flexible film can be used directly at the image stage.

While the present invention has been described in connection with a particular application, namely autoradiography, it will be appreciated that other uses may be made of the apparatus and method taught herein. For example, some of the principles and features of the present invention may be utilized in fluorescence microscopy wherein the specimen is illuminated by ultraviolet radiation transmitted to the microscope slide by the fiber-optic guides.

I claim:

1. A wide field high resolution microscopy camera apparatus comprising:

a camera frame having a lower object end and, vertically aligned thereabove, an upper image end;

an image stage defining an image plane and including a holder for a photographic film;

an object stage defining an object plane and including a holder for a substantially planar object to be photographed;

a lens system carried by said camera frame defining an optical axis;

means mounting the image stage to the image end of said camera frame including a set of three micrometer means located at the vertices of an imaginary equilateral triangle within the image plane with each micrometer means individually providing for adjustable displacement of the image stage relative to the image end along a line parallel to said optical axis and passing through the associated vertex;

means for mounting the object stage to the object end of said camera frame including a second set of three micrometer means located at the vertices of an imaginary equilateral triangle in the object plane with such imaginary triangle being rotated 60° relative to the first named imaginary triangle and with each micrometer means providing individual adjustable displacement of the object stage relative to the object end along a line parallel to said optical axis and passing through the associated vertex, whereby each object stage micrometer means may be adjusted cooperatively with the diametrically opposed image stage micrometer means to adjustably rotate, respectively, the object stage plane and the image stage plane about parallel and spaced apart axes.

2. The apparatus as defined in claim 1 for photographing an object mounted on an upper surface of a microscope slide, said object stage comprising:

a plate mounted to said camera frame object end by said mounting means and having an aperture aligned with said optical axis, index means fixedly carried by said plate at circumferentially spaced locations about said plate aperture on a side thereof opposite from said camera frame for indexing the upper surface of a microscope slide and means for holding such slide against said index means, whereby an object carried on the upper surface of any slide positioned on the object stage is disposed at the same relative distance from said camera frame notwithstanding variations in the thickness of various slides.

3. The apparatus of claim 1 for photographing objects carried by a microscope slide further comprising:

means carried by said object stage for mounting such a slide, and fiber optics light guiding means having a light emitting end flattened and flared to define a generally elongate face with light exiting substantially normal thereto, said fiber optics means being arranged with said elongate face in close confronting registration with a side edge of the slide for directing light therein.

4. The apparatus as defined in claim 3, a source of light for said fiber optics light guiding means comprising, a parabolic reflector with a lamp disposed at the focal point thereof, a spherical reflector coaxially disposed in confronting relationships with the parabolic reflector and with the spherical reflector focused at the region of the lamp, an aperture formed at the center of curvature of said spherical reflector and a planar reflector disposed adjacent the aperture of said spherical reflector therethrough, and means directing light off of said planar reflector into a light receiving end of said fiber optics light guiding means.

5. The apparatus as defined in claim 3, further comprising a first adjustable polarizing filter means disposed between the fiber optics light emitting face and the confronting side edge of said slide, and a second adjustable polarizing filter means disposed between said object stage plane and said camera frame lens system, whereby selective adjustment of said polarizing filter means adjusts the ratio between light reflected from the object to be photographed and unwanted light from other sources.

6. The apparatus as defined in claim 1, wherein said object stage comprises a plate defining said object stage plane, a plurality of spaced apart elongate alignment pins fixedly mounted to said object end of said camera frame and extending therefrom parallel to the optical axis, said object stage plate being provided with a corresponding plurality of pin receiving openings into which said alignment pins extend for generally aligning the object plate to said camera frame, said set of object stage micrometer means being carried by said camera frame and each having an adjustable portion movable relative to said frame along said line passing through the imaginary triangle vertex of said object stage for abutment with said object plate, and means associated with each alignment pin for continuously urging said object plate toward the object end of said camera frame.

7. The apparatus as defined in claim 6, wherein said image stage comprises a plate defining said image stage plane, a second plurality of spaced apart elongate alignment pins fixedly mounted to the image end of said camera frame and extending therefrom parallel to said optical axis, said image stage plate being provided with a corresponding plurality of pin receiving openings into which said alignment pins extend for generally aligning such plate to the camera frame, said set of image stage micrometer means being carried by said camera frame at the image end thereof and each having an adjustable portion movable relative to said frame along said line passing through the imaginary triangle vertex of said image stage for abutment with said image plate, and means associated with each of the second plurality of alignment pins for continuously urging said image plate toward the image end of said camera frame.

* * * * *